Nov. 7, 1944.  F. L. MOSELEY  2,361,956
AUTOMATIC POSITION INDICATING SYSTEM
Filed Dec. 9, 1938   2 Sheets-Sheet 1
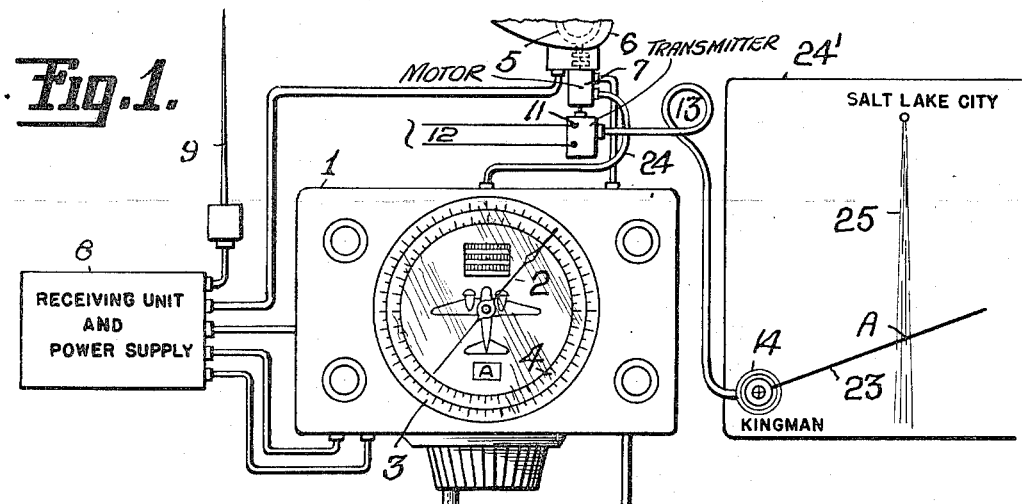
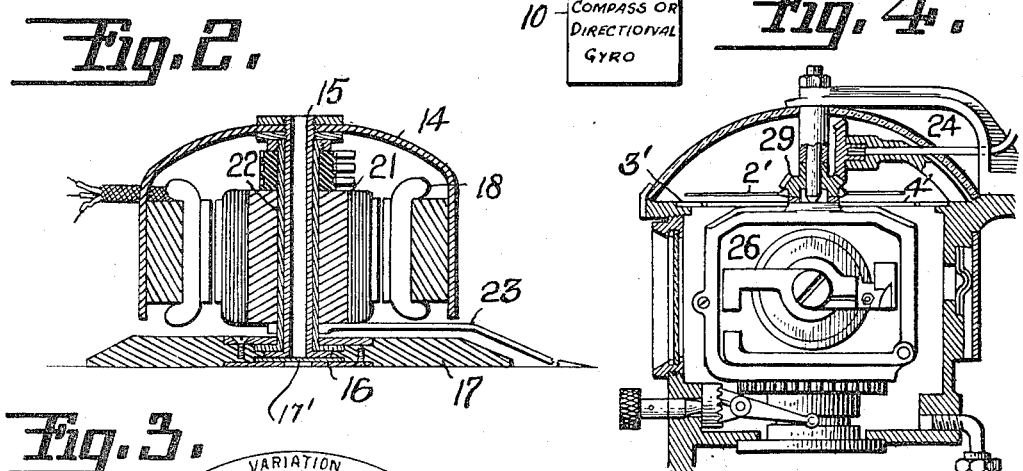
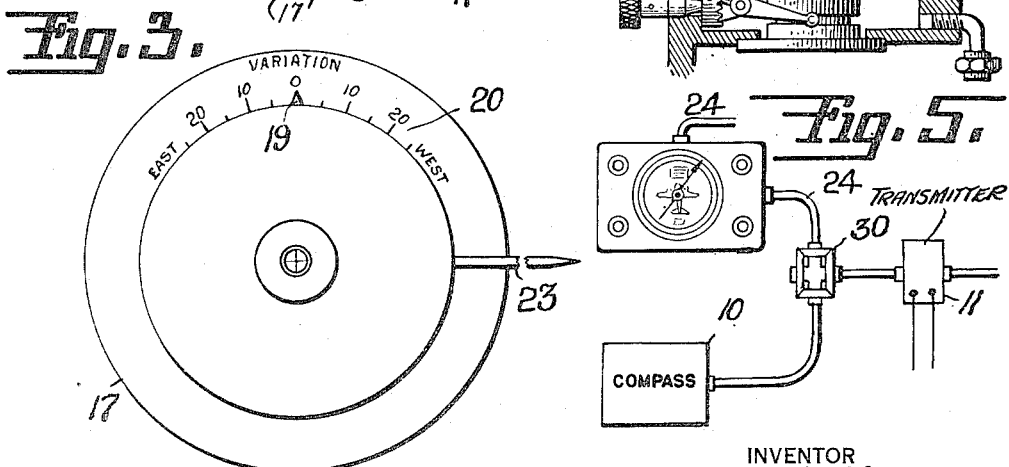
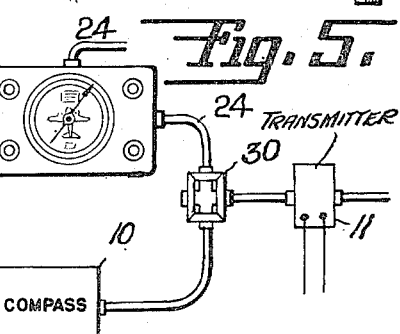
INVENTOR
FRANCIS L. MOSELEY
BY
HIS ATTORNEY Nov. 7, 1944.   F. L. MOSELEY   2,361,956
AUTOMATIC POSITION INDICATING SYSTEM
Filed Dec. 9, 1938   2 Sheets-Sheet 2
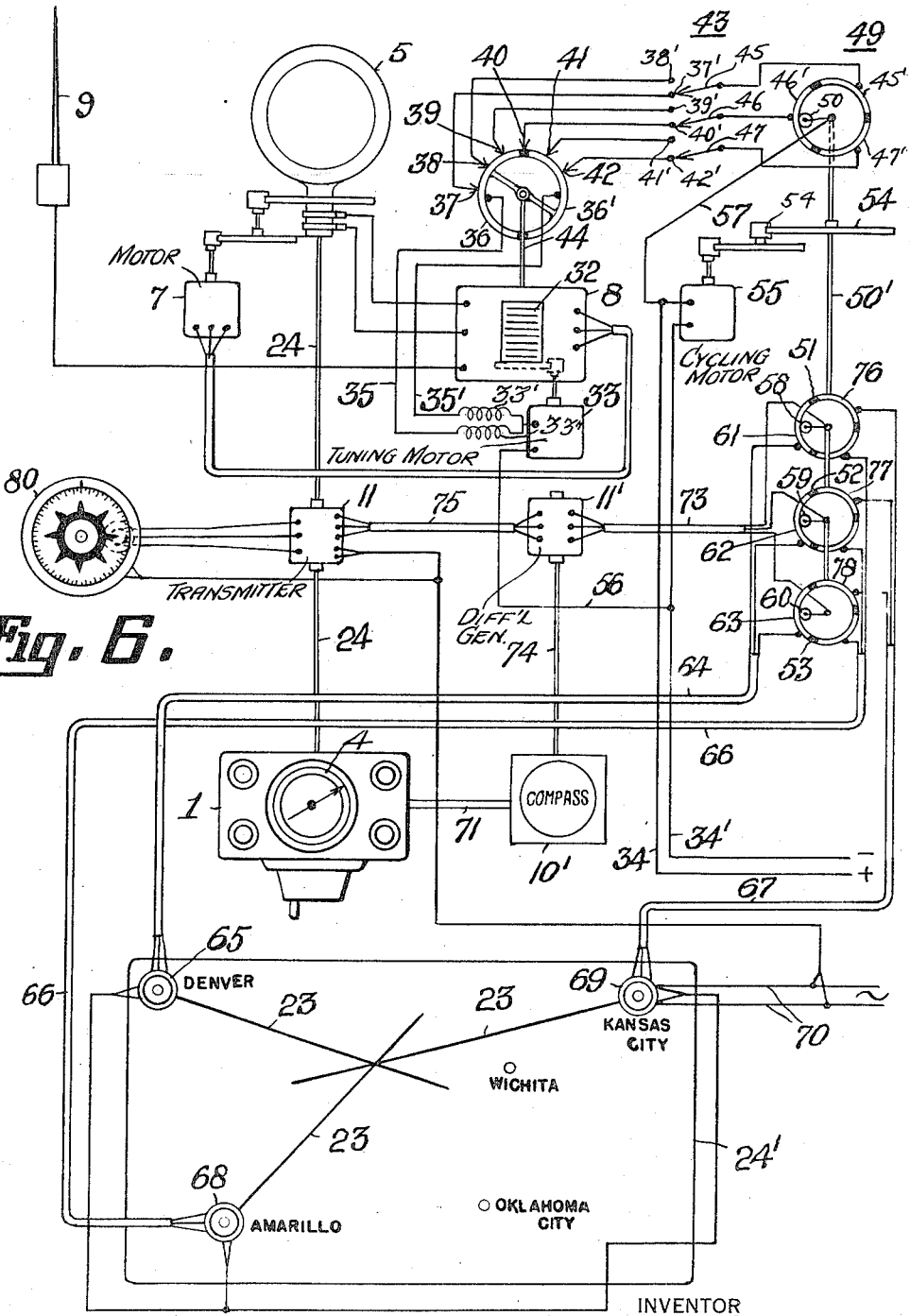
INVENTOR
FRANCIS L. MOSELEY
BY Herbert H. Thompson
HIS ATTORNEY Patented Nov. 7, 1944

2,361,956

UNITED STATES PATENT OFFICE 2,361,956

AUTOMATIC POSITION INDICATING SYSTEM

Francis L. Moseley, Pelham, N. Y., assignor to Sperry Gyroscope Company, Inc., Brooklyn, N. Y., a corporation of New York Application December 9, 1938, Serial No. 244,734

7 Claims. (Cl. 250—11)

This invention relates, generally, to position indicators and the invention has reference, more particularly, to a novel automatic position indicating system adapted for automatically and continuously indicating the position of a vehicle, such as an aircraft, marine vessel, land vehicle, etc., upon a chart or map by use of radio means. Heretofore, attempts have been made to employ radio direction finder loops in conjunction with auxiliary equipment for indicating the position of a vehicle on a chart, but these devices as heretofore constructed have been unduly complicated and more or less undependable in use. The result is that none of these devices has as yet received general acceptance.

The principal object of the present invention lies in the provision of a novel automatic position indicating system wherein suitable direction finding and indicating means is employed in connection with synchronous repeating mechanism for automatically and continuously indicating the position of a vehicle upon a suitable chart or map.

Direction finding apparatus suitable for use in connection with the means of the present invention is disclosed in my prior application Serial No. 170,308, filed October 22, 1937, Patent No. 2,257,757, dated October 7, 1941, for Radio compass navigation apparatus, although other arrangements may obviously be used.

Another object of the present invention is to provide a novel automatic position indicating system wherein suitable commutating and switching means are adapted to be employed for automatically causing the radio compass apparatus to successively indicate the bearings of a plurality of radio stations, which bearings are automatically transformed by suitable synchronous transmission devices for orientating pointers which serve to establish a continuous fix of the vehicle upon the chart or map.

Still another object of the present invention lies in the provision of a novel automatic position indicating system wherein the reference base line for the radio direction finder is automatically maintained through use of a suitable compass, directional gyro or a repeater compass mechanism, such base line being automatically transferred to the map or chart through the use of a suitable device that automatically takes into account the orientation of the vehicle.

Other objects and advantages will become apparent from the specification, taken in connection with the accompanying drawings, wherein the invention is embodied in concrete form.

In the drawings,

Fig. 1 is a schematic view showing a novel automatic position indicating system of this invention arranged for use in conjunction with a vehicle following a radio beam.

Fig. 2 is a vertical sectional view of the synchronous repeater used in Fig. 1.

Fig. 3 is a plan view of the structure of Fig. 2.

Fig. 4 is a vertical fragmentary sectional view showing the use of a directional gyro for establishing the base line for the direction finder.

Fig. 5 shows an apparatus for automatically taking into account the orientation of the moving vehicle by providing between the spindles of the direction finder and the base line reference means a device for compensating for such orientation.

Fig. 6 is a schematic view of the system of the present invention used where the fix is obtained from transmitting stations and where a radio beam is not necessarily employed.

Similar characters of reference are used in all the above figures to indicate corresponding parts.

Referring now to Figs. 1 to 3 of the said drawings, the reference numeral 1 designates the control panel of a radio compass or direction finder having compass pointer 2 which indicates on a fixed compass scale 3 the bearing of a transmitting station relative to an axis or other reference line of the craft and on an inner movable compass scale 4 the bearing of said transmitting station relative to an azimuth reference line such as the magnetic or true north-south line. The reference numeral 5 designates any suitable type of loop antenna within a streamlined housing 6, the loop 5 being driven by a motor 7 that is controlled from the receiver 8 and control panel 1 so that it is continuously oriented and maintained in a fixed relationship to the wave front of the received radio wave, the non-directional antenna 9 being provided for eliminating 180° ambiguity, an antenna arrangement which is well-known in the art of radio direction finders. The usual tuning means is included for selecting the radiation from any desired transmitter. In order to automatically maintain the inner compass scale 4 as an azimuth base line, this scale is positioned by a suitable repeater compass (not shown) controlled from a master compass 10. This master compass may be an ordinary magnetic compass or a directional gyro, the operation of the receiver compass therefrom being well known to those skilled in the art and may involve such structure as disclosed in U. S. Patent No. 1,988,521 of Jan. 22, 1935, of E. A. Sperry, Jr. et al. Structural details, circuits and method of operation of a self-orienting radio direction finder of the type described above are disclosed in my copending application for Radio compass navigation apparatus, Serial No. 170,308, filed October 22, 1937. Among other features the said application discloses means whereby a loop, such as loop 6 of the present invention, may be continuously oriented relative to the direction of reception or wave front of a radio wave so as to follow changes of said direction or wave front quickly and without hunting. By such means, which in the present invention may be included in the receiving unit and power supply 8, a quickly responsive and stable indication of the orientation of loop 6 is obtained relative to a map as further described below.

According to the present invention, a synchronous transmitter generator or transmitter 11 is mounted on the shaft of motor 7 to be driven thereby for repeating to a remote receiver the position of the loop relative to a reference line on the craft. This generator is of the so-called "selsyn" type having a single-phase field winding supplied from leads 12 and a three-phase rotor winding that is connected through a suitable cable 13 to a self-synchronous repeater or receiver 14 having a pointer 23 for indicating the bearing of the vehicle from the desired station, the transmitter 11, receiver 14 and connected circuit forming a synchronous transmitter-receiver circuit. As especially shown in Fig. 2, the casing of the receiver motor 14 is carried by a vertical tubular shaft 15, having a flanged lower end portion 16 that is adapted to be turned within a suitable annular groove provided in the base of the receiver. The tubular shaft 15 provides a sight tube that enables the user to place the receiver 14 centrally on the transmitter station shown on the chart. The sight tube 15 may be provided with cross-hairs marked on a transparent plate 17' provided in the base 17 of the receiver. By this construction, the casing of motor 14 together with the field winding 18 thereof are adapted to be turned angularly with respect to the base 17. This is done when it is desired to introduce corrections into the indications of the instrument, and to accomplish this, the casing of the motor is provided with a projecting index or pointer 19 that cooperates with a correction scale provided on base 17. Thus, for illustration, when map 24' has markings indicating meridians of longitude or other true north-south reference lines, by turning the casing of receiver motor 14 in accordance with magnetic variation, the magnetic bearing may be read with the aid of a protractor. For this type of correction, the correction scale is one of magnetic variation as shown at 20 in Fig. 3.

The rotor 21 of the receiver motor 14 is provided with a tubular shaft 22 that is rotatably mounted on the vertical tubular shaft 15 and carries a pointer 23 that projects outwardly between the casing of the receiver motor and the stationary base 17. This pointer is adapted to extend over the chart or map 24', as shown in Fig. 1.

In use, assuming that the craft is flying a beam, such as the Salt Lake City beam the direction of which may be indicated by a marking on a chart as shown in Fig. 1, the receiver synchronous motor 14, operating in synchronism with loop 5 and pointer 2, will indicate on map 24 a point A showing the instantaneous location of the aircraft or other vehicle with respect to the beam whose direction is shown on the map and to the various landmarks on the map. This is accomplished by first placing receiver 14 on the map so that the intersection of the cross hairs on plate 17 is over the location of the transmitting station and base 17 is oriented so that a line through the intersection of the cross hairs and the zero of scale 20 is parallel to the direction of the beam. With pointer 19 set at this zero, pointer 23 will indicate on the map both the direction and sense of direction of the transmitting station relative to the beam. It is important that the apparatus provide means for indicating this latter quantity since otherwise pointer 23 would be unable to indicate on which side of the beam the transmitter is located.

By the use of non-directional antenna 9, this 180° ambiguity is avoided as is known in the art and discussed in my above mentioned application. The bearing of the pointer 23 relative to north-south lines on the map may be read and if a conversion to magnetic bearings is desired the correction for variation may be introduced by rotating the casing of motor 14 as above described or where magnetic bearings are obtained from the map, a conversion to true bearing may be made in a similar manner.

At the same time that these indications are shown on the map, the bearing of the transmitter relative to the craft's axes and the magnetic bearing may be read on scales 3 and 4 of control panel 1.

As the vessel moves forwardly along the beam 25, the pointer 23 will change its angular position accordingly, thereby continuously indicating automatically the position of the vehicle, such as an aircraft upon the chart. Instead of using a repeater compass for orienting compass card or scale 4, a directional gyro may be arranged to directly orient a similar card. This is shown in Fig. 4, wherein the directional gyro 26, contained directly below the control panel 1 and having the usual caging knob shown, serves to automatically orient the movable card 4', thereby establishing a desired base line of reference in azimuth. In this modification, the flexible transmission shaft 24 shown extending from the loop motor 7 (Fig. 1) operates through bevel gearing 29 to drive the pointer 2', readable as to position on both gyro mounted card 4' and fixed card or index 3'.

Where it is desired to automatically correct for orientation of the vehicle, i. e., adapt the apparatus so that the pointer 23 will correctly indicate upon a chart 24' regardless of turns made by the vehicle, a suitable device as shown in Fig. 5 may be employed. In this device, instead of driving the synchronous transmitter 11 directly from the motor 7, the same is driven from a differential 30 having one side thereof driven by flexible shaft 24 connected to the motor 7 and loop 5 and the other side thereof driven from the compass or directional gyroscope 10; thus as the craft turns the compass or directional gyroscope acts to automatically correct the receiver 14 so that its pointer 23 will properly indicate upon the chart 24', thereby compensating for turns of the vehicle.

In the form of the invention shown in Fig. 6, the radio direction finder is automatically tuned in sequence to a plurality of differing stations at differing localities, whereby the loop 5 is caused to turn correspondingly, so that the plane of the same becomes coincident in sequence with the wave fronts of waves emanating from these respective stations, thereby causing the synchronous repeating system to automatically indicate the bearings of the craft or vehicle from the several stations in regular sequence. In this figure, the tuning condensers 32 of the receiver are shown driven by a tuning motor 33. This motor is illustrated as of the D. C. type supplied from lines 34 and 34'. Motor 33 is provided with reversing windings 33' and 33'' which are respectively connected by leads 35 and 35' to diagonally opposite brushes engaging a split contact ring having substantially semi-circular segments 36 and 36' that are separated by insulating segments and are fixed upon the tuning shaft 44 so as to turn therewith.

A plurality of mutually spaced brushes or contacts 37 to 42 are shown bearing upon the split contact ring 36—36', these brushes being preferably angularly adjustable about the contact ring so as to conform in position to desired stations which are to be tuned in on the receiver 8. Brushes 37 to 42 are respectively connected by suitable leads to the contacts 37' to 42' of a station set-up switch 43 shown as having three blades 45 to 47, which blades are connected respectively by suitable leads to the respective mutually insulated segments 45' to 47' of a stationary contact ring 49. Contact ring 49 is engaged by a roller contact 50 that is carried by a commutating shaft 50' driven through reduction gearing 54 from a cycling motor 55 supplied from leads 34—34'. Contact roller 50 is connected by lead 57 to supply lead 34, whereas the motor 33 is connected by lead 56 to supply lead 34'.

Commutating shaft 50' has contact rollers 58 to 60 thereon for engaging stationary commutating rings 51, 52, and 53, each of these rings having three mutually insulated segments. Similar segments of stationary commutating rings 51 to 53 such as segments 61, 62, and 63 are connected by the three leads of a cable 64 to the three-phase winding of a synchronous receiver motor 65 similar to the motor 14 of Fig. 2. Similarly, the remaining contacts of commutator rings 51 to 53 are connected by three lead cables 66 and 67 to the three-phase windings of synchronous receivers or receiver motors 68 and 69 also similar to motor 14. The single-phase windings of these motors are shown supplied from single-phase leads 70. The generator or transmitter 11 of the self-synchronous transmitter-receiver circuit also has its single-phase winding supplied from A. C. leads 70 and this generator has its three-phase rotor driven from the loop shaft 24. This rotor is connected by a cable 75 to one three-phase winding of a differential synchronous generator or "Selsyn" 11' having its other three-phase winding connected by a cable 73 to the respective roller contacts 58, 59, and 60. The rotor of differential generator 11' is connected by shaft 74 to be driven from the compass 10', which compass also serves through the agency of shaft 71 to maintain the compass inner scale 4 of the control panel 1 as a reference base line.

In operation, the cycling motor 55 acting through reduction gearing 54 serves to turn commutating shaft 50' at a fairly slow rate of speed so that roller 50 turns slowly over the segments of contact ring 49. With roller 50 engaging the contact ring segment 46', current is supplied from lead 34 through lead 57, contact roller 50, segment 46', blade 46, through the lead shown to brush 40. With this brush engaging the insulating piece as shown, no current is supplied to motor 33 indicating that the receiver is tuned to the proper station. Under this condition, since its position is such that more than the minimum signal is received, loop 5 will be automatically rotated by motor 7 to position the loop with its plane parallel to the electromagnetic radiation from the station tuned in, i. e., the directional antenna will be brought to the null position with respect to the direction of arrival of the radio signals from the station. This position of the loop 5 is conveyed by transmitter synchronous generator 11 to differential generator 11' in which the proper correction for orientation of the vehicle is asserted by compass 10'. The output of the differential generator 11' is supplied through cable 73, contact rollers 58, 59, and 60, which at this time are in contact with segments 61, 62, and 63 respectively, and cable 64 to synchronous receiver motor 65, causing the pointer 23 of this receiver to indicate the bearing of the craft from the station, the station in this case being Denver with the synchronous motor 65 placed thereon on map 24'.

As the commutating shaft 50' continues to turn, the roller 50 will move around and on to segment 45' of commutator 49. This will cause current to be supplied from lead 34 through lead 57, roller 50, segment 45', blade 45, contact 37', brush 37, segment 36, and lead 35 to one field winding of motor 33, through the armature of this motor and through lead 56 back to supply lead 34'. Thus, motor 33 is energized to turn in the proper direction so that the tuning shaft 44 is turned causing contact ring 36—36' to turn until an insulating segment is brought under brush 37, whereupon the supply to motor 33 is cut off and this motor comes to rest with the radio receiver tuned upon the Kansas City transmitter. If a signal is received on the wave length of this transmitter, due to misalignment of the loop it will cause the loop 5 to be turned through the operation of servomotor 7 so that the transmitter generator 11 acting through cable 75, differential generator 11', cable 73, contact rollers 58, 59, 60 and commutating segments 76, 77, and 78 through cable 67 to the three-phase winding of the synchronous receiver 69, causes the pointer 23 of this receiver motor to indicate the bearing of the craft from Kansas City.

Similarly, continued turning of the commutator shaft 50' will cause roller 50 to contact segment 47', thereby causing the tuning motor 33 to be operated so as to tune the receiver 8 upon the station at Amarillo, thereby causing the motor 7 to orient the loop 5 so as to be parallel to the waves emanating from the Amarillo radio transmitter resulting in the operation of the generator or transmitter 11, differential generator 11', and the commutating means shown to cause the receiver or receiver motor 68 to indicate the bearings of the craft from the station at Amarillo.

The point at which the three pointers 23 intercept continuously gives the fix of the craft upon the map 24'. As the craft advances along its course, the pointers 23 of the several receivers will automatically shift so as to always indicate at their point of intersection the location of the craft, whereby the pilot and navigator are continuously appraised of their exact position upon the map, covering the territory over which they are flying.

Owing to the use of the differential generator 11' operated from compass 10', any turns the vehicle or craft makes are automatically compensated for, so that correct indications are given by the pointers 23 upon the map 24'. A radio compass repeater 80 is shown supplied from the three-phase windings of generator 11. This compass may be located at any convenient point on the craft and will give the bearings of the stations in sequence with respect to the heading of the craft. Should it be desired to indicate the bearings of the stations with respect to true north, this repeater compass is supplied from the differential generator 11', as will be apparent.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an automatic position indicating system for craft, a directional antenna, motive means for orienting said antenna, a radio receiver connected to said antenna, motive means for tuning said receiver, commutating means for controlling said tuning motive means whereby said receiver is tuned in sequence to a plurality of stations, said directional antenna being oriented successively to the several stations by said orienting means in respective synchronism with the tuning-in of these stations, a transmitter movable at least in part from said directional antenna, a map of the terrain over which said craft is passing, a plurality of synchronous receivers mounted on said map in coincidence with said respective stations, said receivers having indicators, and commutating means for successively connecting said receivers to said transmitter in synchronism to the operation of said first named commutating means, whereby the plurality of receivers operate to indicate the location of the craft upon said map.

2. In an automatic position indicating system, a directional antenna, motive means for orienting said antenna, a radio receiver fed from said antenna, motive means for tuning said receiver, commutating means for controlling said last named motive means, and means associated with said commutating means for tuning said receiver in sequence to a plurality of stations, said first named motive means acting to turn said directional antenna toward said stations in sequence and for predetermined periods in respective synchronism with the tuning-in of these stations.

3. A radio navigation indicating system comprising a self-orienting radio compass, a chart, a remote indicating system having an electrical transmitter actuated in accordance with the orientation of said compass relative to a magnetic bearing and an electrical receiver positioning an indicator relative to said chart, said receiver having means including a pair of relatively displaceable members for effecting an offset of said indicator relative to the orientation of said compass in proportion to the magnetic variation at the location of said system, and a scale on one of said members for measuring said displacement.

4. A radio navigation indicating system comprising a self-orienting radio compass including a radio receiver and a variable tuning means therefor, a chart, a positional data transmitter actuated in accordance with the orientation of said compass, a plurality of data receivers suitable for remote actuation by said transmitter including connecting means between said transmitter and receivers, a plurality of contact members respectively positioned in accordance with the frequencies radiated by a corresponding number of radio transmitters, contact means cooperative in sequence therewith, motive means controlled by said cooperating contacts for displacing a member of said tuning means to tune the receiver in repeated sequence to the frequencies determined by the positions of said contact members, and switching means for connecting said data receivers to said data transmitter in similar repeated sequence and in synchronism with said periodic change of receiver tuning.

5. In a radio direction finder including a directional antenna, a radio receiver and means for orienting said antenna in accordance with the direction of reception of a wave to which said receiver is tuned, variable tuning means for said receiver, a commutator having a plurality of conducting segments insulated one from the other, motive means for operating said tuning means and said commutator together, a plurality of groups of contact members, members of each group being positionable about said commutator for making contact with the conducting and insulating segments thereof, means including said members and commutator for controlling said motive means to cause said receiver to be sequentially tuned to frequencies respectively corresponding to the position of said contact members, and means for selectively rendering one of said contact groups operative.

6. In a radio direction finder including a directional antenna, a radio receiver and means for orienting said antenna in accordance with the direction of reception of a wave to which said receiver is tuned, variable tuning means for said receiver, a commutator having a conducting and an insulating segment, brushes disposed in predetermined relation about said commutator, means for rendering said respective brushes sequentially operative, and motive means for displacing said commutator and operating said tuning means, said motive means being responsive to the cooperation between an operative brush and said conducting segment to displace said commutator until said operative brush makes contact with said insulating segment, whereby said tuning means is shifted to a position corresponding to the position of said operative brush.

7. A radio direction finder as claimed in claim 6 wherein said commutator includes a plurality of mutually-insulated conducting segments, and separate contact members cooperable therewith for reversibly controlling said motive means.

FRANCIS L. MOSELEY.